(12) United States Patent
Schmid et al.

(10) Patent No.: US 9,500,248 B2
(45) Date of Patent: Nov. 22, 2016

(54) ELASTOMERIC LINE DAMPER

(71) Applicant: Poppe GmbH, Gießen (DE)

(72) Inventors: Norbert Schmid, Pohlheim (DE); Johannes Beckert, Waldsolms (DE)

(73) Assignee: Poppe GmbH, Giessen (DE)

( * ) Notice: Subject to any disclaimer, the term of this patent is extended or adjusted under 35 U.S.C. 154(b) by 0 days.

(21) Appl. No.: 14/552,581

(22) Filed: Nov. 25, 2014

(65) Prior Publication Data
US 2015/0152932 A1  Jun. 4, 2015

(30) Foreign Application Priority Data
Nov. 29, 2013 (DE) .......... 10 2013 113 224

(51) Int. Cl.
F16F 7/108 (2006.01)
F16L 55/033 (2006.01)
F16L 55/035 (2006.01)

(52) U.S. Cl.
CPC ............. F16F 7/108 (2013.01); F16L 55/035 (2013.01); F16L 55/0336 (2013.01)

(58) Field of Classification Search
CPC ...... F16F 7/108; F16F 2228/005; F16F 1/37; F16L 55/035; F16L 3/223; F16L 3/14; F16L 55/0336
USPC .................................... 188/380; 248/55, 62
See application file for complete search history.

(56) References Cited

U.S. PATENT DOCUMENTS

| 3,684,223 A * | 8/1972 | Logsdon | F16L 3/12 |
| | | | 24/350 |
| 5,731,359 A * | 3/1998 | Moser | F16F 1/37 |
| | | | 267/140.11 |
| 2001/0008265 A1 * | 7/2001 | Hauer | F16L 3/1075 |
| | | | 248/74.2 |
| 2002/0070316 A1 * | 6/2002 | Howe | F16L 3/14 |
| | | | 248/62 |
| 2003/0042086 A1 * | 3/2003 | Nylander | F16F 15/1442 |
| | | | 188/159 |
| 2004/0144886 A1 * | 7/2004 | Le Helley | F02K 9/32 |
| | | | 244/3.1 |
| 2006/0273226 A1 * | 12/2006 | Jatzke | F16L 3/223 |
| | | | 248/68.1 |
| 2008/0012188 A1 * | 1/2008 | Dickson | F16F 1/3732 |
| | | | 267/139 |
| 2008/0012263 A1 * | 1/2008 | Dickson | B60G 13/003 |
| | | | 280/124.155 |
| 2010/0207001 A1 * | 8/2010 | Smith | F16L 3/1075 |
| | | | 248/230.4 |

FOREIGN PATENT DOCUMENTS

| AU | 2008252025 A1 | 6/2010 |
| EP | 1099899 A2 | 5/2001 |
| EP | 1106900 A1 | 6/2001 |
| WO | 2004013534 A1 | 2/2004 |

OTHER PUBLICATIONS

German search report dated Sep. 2, 2014.
Extended European Search Report dated Jan. 20, 2015.

* cited by examiner

Primary Examiner — Robert A Siconolfi
Assistant Examiner — San Aung
(74) Attorney, Agent, or Firm — Wiggin and Dana LLP; Gregory S. Rosenblatt; Jonathan D. Hall

(57) ABSTRACT

The disclosed subject matter relates to an elastomeric line damper having a circumferential portion for enclosing a pipeline and having a toothed portion with teeth for placing against the pipeline, which teeth are arranged on the inner side of the circumferential portion and are formed from a porous elastomer material.

11 Claims, 3 Drawing Sheets

ELASTOMERIC LINE DAMPER

CROSS REFERENCE TO RELATED APPLICATION

This application claims priority to German Patent Application No. DE 10 2013 113 224.3 filed on Nov. 29, 2013. The disclosure of German Patent Application No. 10 2013 113 224.3 is hereby incorporated by reference herein in its entirety.

FIELD OF DISCLOSURE

The present disclosure relates to an elastomeric line damper for enclosing a pipeline.

BACKGROUND

Document EP 1 099 899 A2 describes a hose for holding pipelines. This hose is produced from a solid material.

The object on which the present disclosure is based is to improve the damping properties of an elastomeric line damper.

BRIEF DESCRIPTION

This object is achieved by the subject matter having the features according to the independent claim. Advantageous embodiments of the disclosed subject matter are the subject matter of the figures, the description and the dependent claims.

According to one aspect of the disclosed subject matter, the object is achieved by an elastomeric line damper having a circumferential portion for enclosing a pipeline and having a toothed portion with teeth for placing against the pipeline, which teeth are arranged on the inner side of the circumferential portion and are formed from a porous elastomer material. By comparison with a solid material, for example, the porous elastomer material makes it possible to achieve the technical advantage that it has better vibration damping properties. Air- and structure-borne noise can therefore be effectively damped. In addition, the porous elastomer material has better thermal insulation. When producing the line damper, foaming makes it possible to save on raw material.

In an advantageous embodiment of the line damper, the circumferential portion is formed from the porous elastomer material. This makes it possible, for example, to achieve the technical advantage that the damping properties are further improved.

a further advantageous embodiment of the line damper, the porous elastomer material has a pore size of between 20 μm and 150 μm. This makes it possible, for example, to achieve the technical advantage that particularly effective damping is achieved.

In a further advantageous embodiment of the line damper, the porous elastomeric material has a density of between 0.5 $g/cm^3$ and 1.2 $g/cm^3$. This makes it possible, for example, to achieve the technical advantage that the elastomer material has a high degree of strength.

In a further advantageous embodiment of the line damper, the porous elastomer material comprises metal particles or ceramic portions for increasing thermal conductivity. This makes it possible, for example, to achieve the technical advantage that heat can be removed from the pipeline.

In a further advantageous embodiment of the line damper, the pore size of the porous elastomer material in the teeth is greater than the pore size in the circumferential portion. This makes it possible, for example, to achieve the technical advantage that better damping properties are obtained in the teeth, while a higher degree of stability is achieved in the circumferential portion.

In a further advantageous embodiment of the line damper, the circumferential portion is formed from a first porous elastomer material and the teeth are formed from a second porous elastomer material. This makes it possible, for example, to achieve the technical advantage that the positive properties of different elastomer materials are combined with one another.

In a further advantageous embodiment of the line damper, the porous elastomer material comprises ethylene-propylene-diene rubber (EPDM). This makes it possible, for example, to achieve the technical advantage that a material having particularly good damping and strength properties is used.

In a further advantageous embodiment of the line damper, the toothed portion comprises first teeth having a first pore size and second teeth having a second pore size. This makes it possible, for example, to achieve the technical advantage that teeth having different damping properties are realised.

In a further advantageous embodiment of the line damper, the toothed portion comprises first teeth made of a first porous elastomer material and second teeth made of a second porous elastomer material. This likewise makes it possible, for example, to achieve the technical advantage that teeth having different damping properties are realised.

In a further advantageous embodiment of the line damper, the circumferential portion comprises a closure portion for closing the circumferential portion around the pipeline. This makes it possible, for example, to achieve the technical advantage that the line damper can be laid around the pipeline at any desired point.

In a further advantageous embodiment of the line damper, the closure portion is formed from an elastomeric solid material. This makes it possible, for example, to achieve the technical advantage that the strength of the closure portion is increased.

In a further advantageous embodiment of the line damper, the elastomeric solid material is ethylene-propylene-diene rubber (EPDM). This makes it possible, for example, to achieve the technical advantage that the closure portion has a high degree of strength.

In a further advantageous embodiment of the line damper, the circumferential portion is closed in a ring shape. This makes it possible, for example, to achieve the technical advantage that the line damper cannot be released from the pipeline.

In a further advantageous embodiment of the line damper, the teeth are triangular, rectangular or trapezoidal in cross section. This makes it possible, for example, to achieve the technical advantage that, in conjunction with the porous elastomer material, particularly good damping properties are obtained.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

Exemplary embodiments of the disclosed subject matter are illustrated in the drawings and are described in more detail hereinbelow.

In the drawings.

It is to be understood that both the foregoing general description and the following detailed description are exemplary and explanatory only, and are intended to provide an explanation of various embodiments of the present teachings.

DETAILED DESCRIPTION

Figure 1:
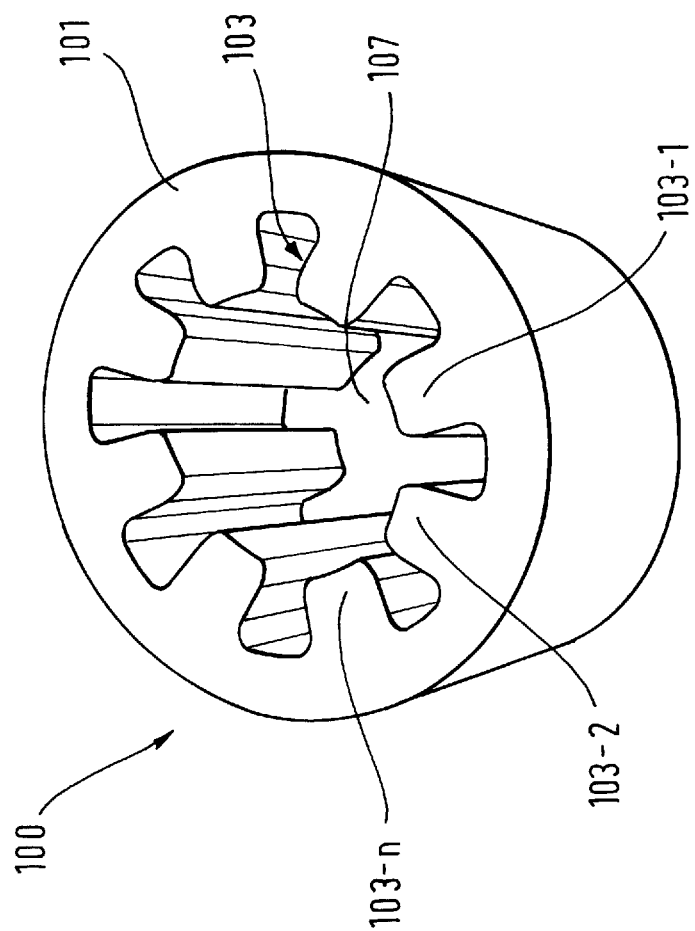
FIG. 1 shows a view of a closed line damper.

FIG. 1 shows a view of a closed elastomeric line damper 100 which forms a toothed ring. The elastomeric line damper 100 comprises a circumferential portion 101 closed in a ring shape. A toothed portion 103 having rib-like projecting teeth 103-1, 103-2, . . . , 103-n is formed on the inner side of the circumferential portion 101. The teeth 103-1, 103-2, . . . , 103-n form a toothing on the inner side of the circumferential portion 101 and serve to absorb jolts and vibrations of an inserted pipeline.

An opening 107 into which the pipeline is inserted is situated inside the line damper 100. Here, the teeth 103-1, 103-2, . . . , 103-n of the toothed portion 103 are placed against the pipeline such that the line damper 100 is held on the pipeline. The teeth 103-1, 103-2, . . . , 103-n are compressed when the pipeline is inserted into the elastomeric line damper 100.

The teeth 103-1, 103-2, . . . , 103-n and the circumferential portion 101 are formed from an elastomer material having micropores, with the result that the teeth 103-1, 103-2, . . . , 103-n have good mechanical damping properties. By comparison with a solid material, the porous elastomer material has a weight advantage and better vibration damping properties. Moreover, the porous elastomer material has better thermal insulation than the solid material.

The elastomeric line damper 100 can be used as a damping element or as anti-rattle protection for lines and line systems. In these applications, the elastomeric line damper 100 functions as a protective, damping and bundling element on pipelines of different designs and of different materials.

Figure 2:
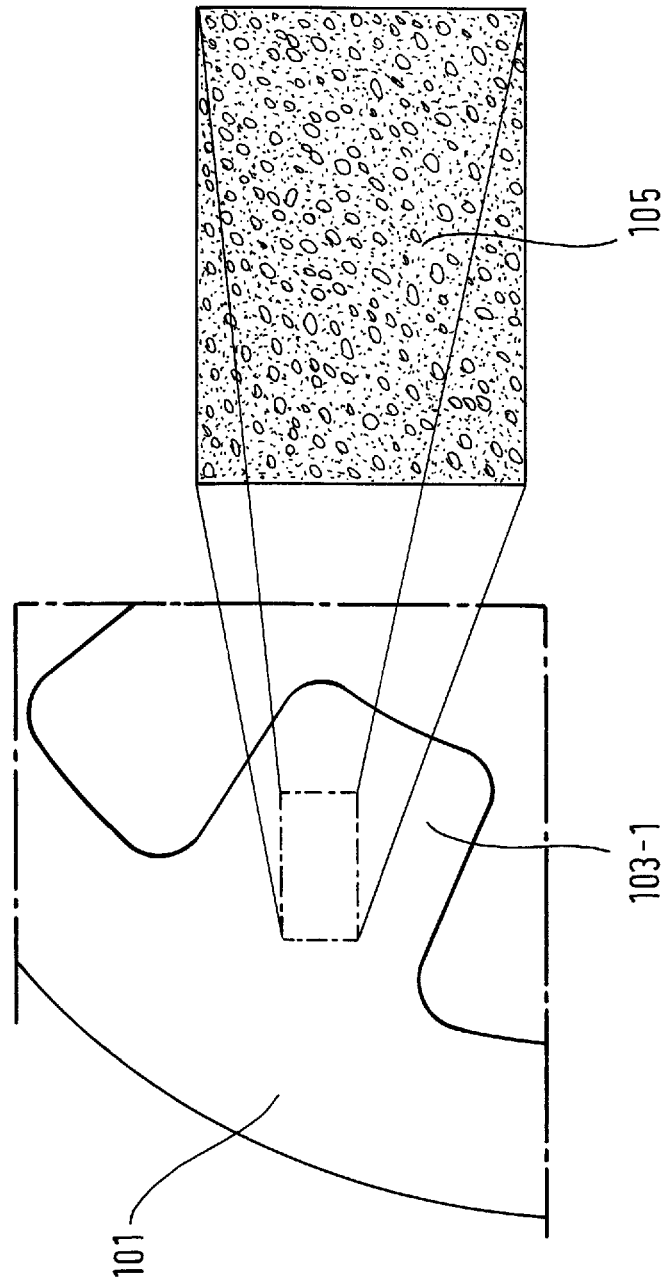
FIG. 2 shows an enlarged view of the line damper.

FIG. 2 shows an enlarged view of the line damper 100 with the circumferential portion 101 and the tooth 103-1. The porous elastomer material 105 from which the circumferential portion 101 and the tooth 103-1 are formed has, for example, a pore size of between 20 μm and 150 μm and a density of between 0.5 g/cm$^3$ and 1.2 g/cm$^3$. The porous elastomer material 105 can be produced by foaming an elastomer material 105 by means of a blowing agent or by chemical or physical foaming. Ethylene-propylene-diene rubber (EPDM) or nitrile rubber (NBR) can be used, for example, as elastomer material. In general, it is also possible for other suitable elastomers to be used. Foaming ensures that the component density is less than the raw density of the starting material.

The pore size of the porous elastomer material 105 can vary in different regions of the line damper 100 such that, depending on the requirement, the pore size can be used to set different properties of the porous elastomer material 105. For example, the pore size of the porous elastomer material 105 in the teeth 103-1, 103-2, . . . , 103-n can be greater than the pore size in the circumferential portion 101. As a result, the damping properties of the teeth 103-1, 103-2, . . . , 103-n can be improved and the loadability of the circumferential portion 101 can be increased. The toothed portion 103 can, for example, comprise teeth 103-1 having a first pore size and teeth 103-2 having a second pore size, which teeth can, moreover, be formed from different porous elastomer materials.

Furthermore, the circumferential portion 101 and the teeth 103-1, 103-2, . . . , 103-n can be formed from different porous elastomer materials. Moreover, the porous elastomer material 105 can comprise metal particles, such as, for example, copper, or ceramic substances for increasing thermal conductivity, with the result that heat can be removed from the pipeline should this be required.

Figure 3:
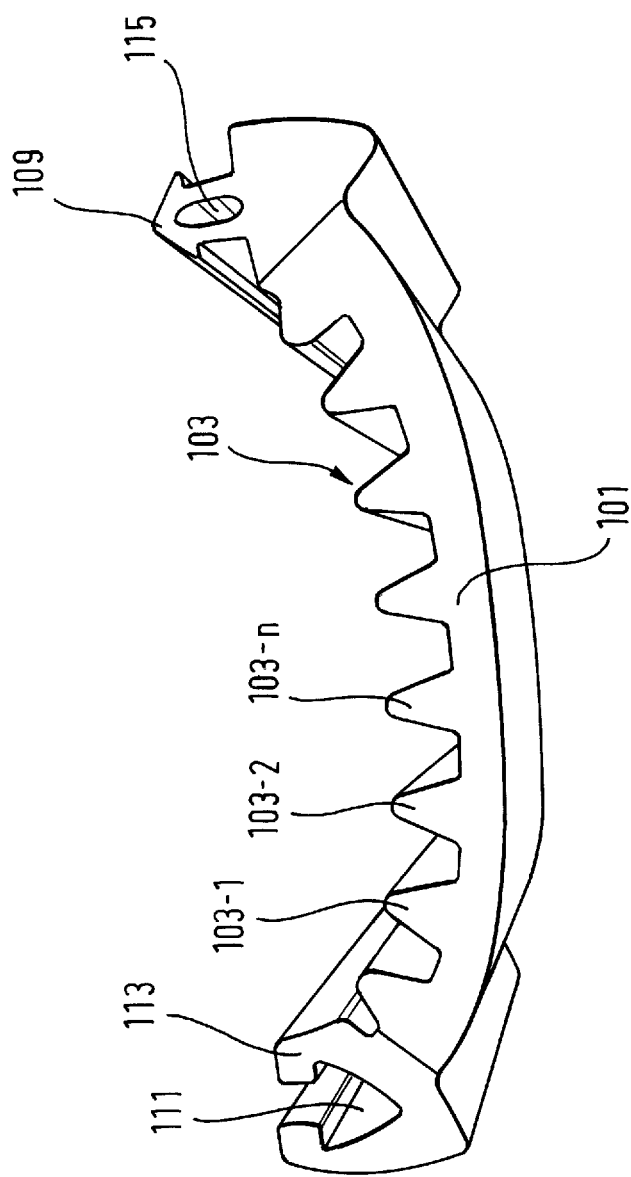
FIG. 3 shows a view of a further line damper in the open state.

FIG. 3 shows a view of a line damper 100 whose circumferential portion 101 is not closed and which forms a toothed clip ring. A barb 109 is formed on one end of the circumferential portion 101 and a receiving opening 111 for inserting and receiving the barb 109 is formed on the other end of the circumferential portion 101. Thus results in an integral, one-piece closure portion 113 in the circumferential portion 101, which allows the line damper 100 to be able to be placed on the pipeline and closed at any desired points. When closing the line damper 100, the barb 109 is pressed into the receiving opening 111. As a result, the teeth 103-1, 103-2, . . . , 103-n are placed against the pipeline and compressed. In this case, the line damper 100 is not displaced along the pipeline but is placed at an intended point.

The barb 109 and the slot-shaped receiving opening 111 are formed from a hard elastomeric solid material without pores in order to ensure that the closure portion 113 has sufficient strength. The hollow barb 109 comprises an opening 115 which increases the elasticity of the barb 109 in the area of use. By contrast, the teeth 103-1, 103-2, . . . , 103-n are produced from a porous elastomer material 105 and also serve in this case to damp vibrations of the inserted pipeline. The teeth 103-1, 103-2, . . . , 103-n are triangular with equal sides in cross section. In general, however, the teeth can have any desired shape.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

All the features explained and shown in connection with individual embodiments of the disclosed subject matter can be provided in different combinations according to the present disclosure in order to simultaneously realise their advantageous effects.

The scope of protection of the present disclosure is given by the claims and is not restricted by the features explained in the description or shown in the figures.

What is claimed:

1. Elastomeric line damper having a circumferential portion for enclosing a pipeline and having a toothed portion with teeth for placing against the pipeline, which teeth are arranged on the inner side of the circumferential portion and are formed from a porous elastomer material, wherein
   the pore size of the porous elastomer material in the teeth is greater than the pore size in the circumferential portion, wherein
   the porous elastomer material comprises ethylene-propylene-diene rubber (EPDM) or nitrile rubber (NBR);
   wherein the toothed portion comprises first teeth having a first pore size and second teeth having a second pore size; and wherein the toothed portion comprises first teeth made of a first porous elastomer material and second teeth made of a second porous elastomer material.

2. Elastomeric line damper of claim 1, wherein the circumferential portion is formed from the porous elastomer material.

3. Elastomeric line damper of claim 1, wherein the porous elastomer material has a pore size of between 20 µm and 150 µm.

4. Elastomeric line damper of claim 1, wherein the porous elastomer material has a density of between 0.5 g/cm$^3$ and 1.2 g/cm$^3$.

5. Elastomeric line damper of claim 1, wherein the porous elastomer material comprises metal particles or ceramic portions for increasing thermal conductivity.

6. Elastomeric line damper of claim 1, wherein the circumferential portion is formed from a first porous elastomer material and the teeth are formed from a second porous elastomer material.

7. Elastomeric line damper of claim 1, wherein the circumferential portion comprises a closure portion for closing the circumferential portion around the pipeline.

8. Elastomeric line damper of claim 7, wherein the closure portion is formed from an elastomeric solid material.

9. Elastomeric line damper of claim 8, wherein the elastomeric solid material is ethylene-propylene-diene rubber (EPDM).

10. Elastomeric line damper of claim 1, wherein the circumferential portion is closed in a ring shape.

11. Elastomeric line damper of claim 1, wherein the teeth are triangular, rectangular or trapezoidal in cross section.

\* \* \* \* \*